US008245399B2

(12) United States Patent

Anantharaman et al.

(10) Patent No.: US 8,245,399 B2

(45) Date of Patent: Aug. 21, 2012

(54) REPLACEMENT OF PART OF ENGINE CASE WITH DISSIMILAR MATERIAL

(75) Inventors: Ganesh Anantharaman, East Hartford, CT (US); David J. Bartholic, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 884 days.

(21) Appl. No.: 12/356,321

(22) Filed: Jan. 20, 2009

(65) Prior Publication Data

US 2010/0180417 A1 Jul. 22, 2010

(51) Int. Cl.
*B23P 6/00* (2006.01)

(52) U.S. Cl. .................................... 29/889.1; 29/402.03

(58) Field of Classification Search ................. 29/889.1, 29/402.03
See application file for complete search history.

(56) References Cited

U.S. PATENT DOCUMENTS 3,182,955 A 5/1965 Hyde
3,907,455 A 9/1975 Monsarrat
RE29,212 E * 5/1977 Baldi et al. .................... 427/253
4,176,433 A 12/1979 Lee et al.
4,194,869 A 3/1980 Corcokios
4,305,697 A 12/1981 Cohen et al.
4,498,617 A 2/1985 Guertin et al.
4,597,258 A 7/1986 Harris
5,071,054 A 12/1991 Dzugan et al.
5,269,057 A 12/1993 Mendham
6,128,820 A 10/2000 Nolan et al.
6,154,959 A 12/2000 Goodwater et al.
6,173,491 B1 1/2001 Goodwater et al.
6,394,750 B1 5/2002 Hiskes
6,416,278 B1 7/2002 Caddell, Jr. et al.
6,494,683 B1 12/2002 Nolan et al.
6,785,961 B1 9/2004 Caddell, Jr. et al.
6,793,457 B2 9/2004 Caddell et al.
6,892,931 B2 * 5/2005 Steplewski et al. ........... 228/119
6,984,101 B2 * 1/2006 Schiavo, Jr. ................... 415/115
6,986,201 B2 1/2006 Moertle et al.
7,244,320 B2 7/2007 Malley et al.
2005/0173493 A1 8/2005 Workman et al.
2006/0039788 A1 * 2/2006 Arnold et al. ............. 416/204 R
2007/0289954 A1 12/2007 Bien et al.
2008/0000193 A1 1/2008 Holland et al.

OTHER PUBLICATIONS

Quantum Alloys Ltd, "Iconel 625, Alloy 625", from http://www.quantumalloys.com/data/nickel/625.html, visited Jun. 2, 2008 (2 pages).
"AMS 5616 Alloy (Greek Ascoloy)", from http://www.cartech.com/products/wr_products_aero_ams.html, visited May 30, 2008 (1 page).

* cited by examiner

*Primary Examiner* — Julio J Maldonado
*Assistant Examiner* — Robert Bachner
(74) *Attorney, Agent, or Firm* — Kinney & Lange, P.A.

(57) ABSTRACT

A method of repairing a case for a gas turbine engine includes removing a first portion of the case from a second portion of the case and metallurgically joining a replacement material to the second portion of the case to form a repaired case. The first portion of the case includes a connection flange having a plurality of bolt holes formed therein. The replacement material has a different coefficient of thermal expansion than a parent material of the second portion of the case.

16 Claims, 3 Drawing Sheets

REPLACEMENT OF PART OF ENGINE CASE WITH DISSIMILAR MATERIAL

BACKGROUND

This disclosure relates to methods for repairing engine components and the repaired components produced by such methods.

Engine components, such as case structures for gas turbine engines, can become worn or damaged during use. For example, thermal-related damage and low-cycle fatigue (LCF) can necessitate gas turbine engine case replacement or repair. Replacement of worn and damaged parts can be costly, while repairs to existing parts can be more cost-effective. It is desirable to reduce both turnaround time (TAT) and cost associated with repair procedures. However, TAT and cost can be adversely affected by the amount of rework required during repair. It is also desirable for repairs to be robust in order to help reduce costs and time off-wing in the long term, such as by reducing the need for future repairs.

SUMMARY

A method of repairing a case for a gas turbine engine includes removing a first portion of the case from a second portion of the case and metallurgically joining a replacement material to the second portion of the case to form a repaired case. The first portion of the case includes a connection flange having a plurality of bolt holes formed therein. The replacement material has a different coefficient of thermal expansion than a parent material of the second portion of the case.

DETAILED DESCRIPTION

Figure 1:
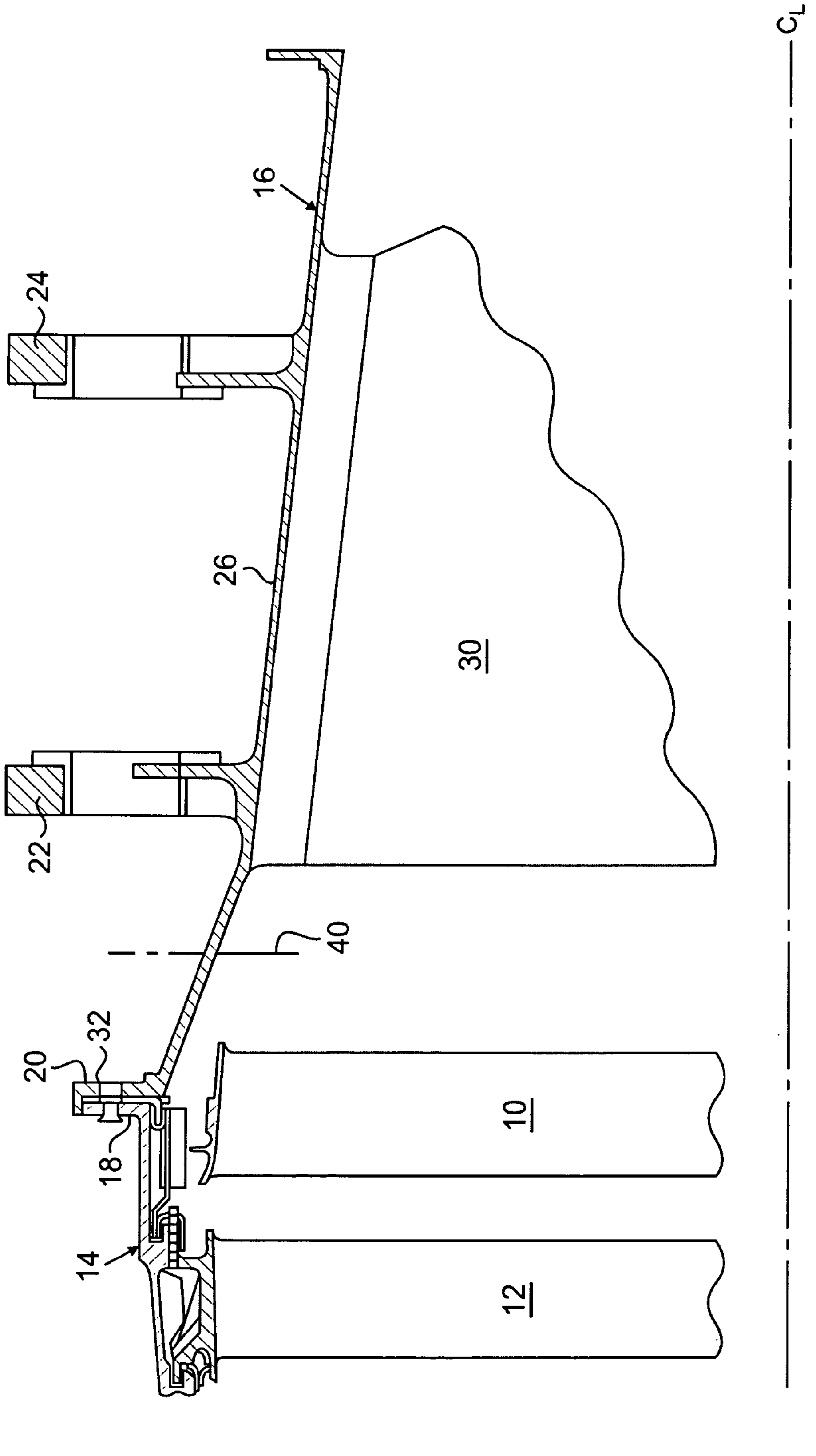
FIG. 1 is a cross-sectional view of a portion of a gas turbine engine.
Figure 2:
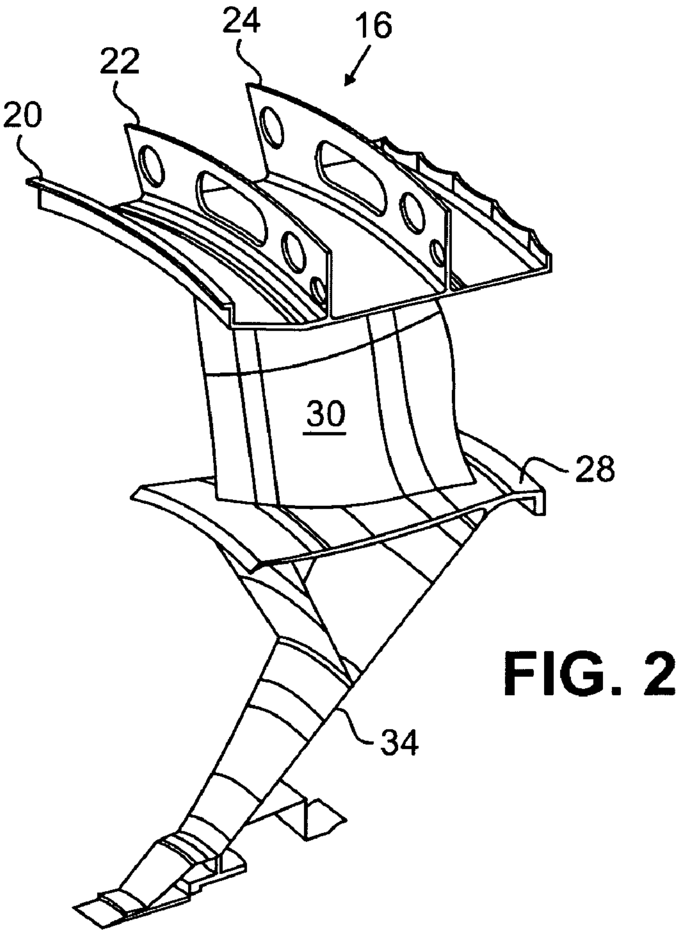
FIG. 2 is an isometric view of a turbine exhaust case segment of the gas turbine engine.

FIG. 1 is a cross-sectional view of a portion of a gas turbine engine, including a low-pressure turbine (LPT) blade 10, a LPT vane 12, a LPT case 14, and a turbine exhaust case (TEC) segment 16, all arranged relative to an engine centerline CL. FIG. 2 is an isometric view of the TEC segment 16. The LPT case 14 includes a flange 18, which is located at an aft portion of the LPT case 14 near the aftmost LPT blade 10. The LPT case 14 can be made of a metallic material, for instance, a superalloy such as a nickel-based superalloy consistent with Aerospace Materials Specification (AMS) 5666 specifications (e.g., Inconel® 625).

The TEC segment 16 includes flanges 20, 22 and 24 extending from an outer diameter (OD) wall 26, an inner diameter (ID) wall 28, and at least one vane 30 extending between the OD and ID walls 26 and 28. The flange 20 is located at a forward portion of the TEC 16, and is configured to be mechanically connected at a bolt hole 32 to the flange 18 of the LPT case 14 with a bolt or other suitable fastener. As shown in FIG. 2, support structures 34 can extend from the ID wall 28, to facilitate mounting the TEC segment 16 in the engine. A plurality of TEC segments 16 can be assembled together to form a generally annular TEC assembly about the engine centerline CL, with a generally annular exhaust flowpath defined between the OD and ID walls 26 and 28 and the vanes 30 in a cascade configuration, in manner well known in the art. The TEC segment 16 can be made of a metallic material, for instance, a stainless steel such as a martensitic stainless steel consistent with AMS 5616 specifications (e.g., Greek Ascoloy™). It should be noted that the general configuration and operation of gas turbine engines is well known, and therefore is not discussed in detail here.

During use, the TEC segment 16 can become warped or damaged, for example, due to thermal conditions and low-cycle fatigue (LCF). Moreover, creep can occur at the flange 20 of the TEC segment 16. Creep can be particularly problematic because the LPT case 14 and the TEC segment 16 can be made of different materials (e.g., Inconel® 625 and Greek Ascoloy™, respectively) with different coefficients of thermal expansion, which can cause undesirable elongation of the bolt hole 32 and bending of the flange 20. Wear or damage to the TEC segment 16 can be repaired according to the disclosed method (see FIG. 4).

During repair, a cut plane 40 on the TEC segment 16 is determined (see FIG. 1). The flange 20 is removed from the rest of the TEC segment 16 at the cut plane 40, using a suitable machining process for example. The cut plane 40 is generally located at a relatively low-stress area of the TEC segment 16. In one embodiment, the cut plane 40 is located such that the material removed includes the entire flange 20 as well as an approximately 3.81-5.08 cm (1.5-2 inch) portion of the OD wall 26. A replacement detail is created (or otherwise provided) to replace the removed material, and is welded to parent material of the TEC segment 16 at the location of the cut plane 40.

Figure 3:
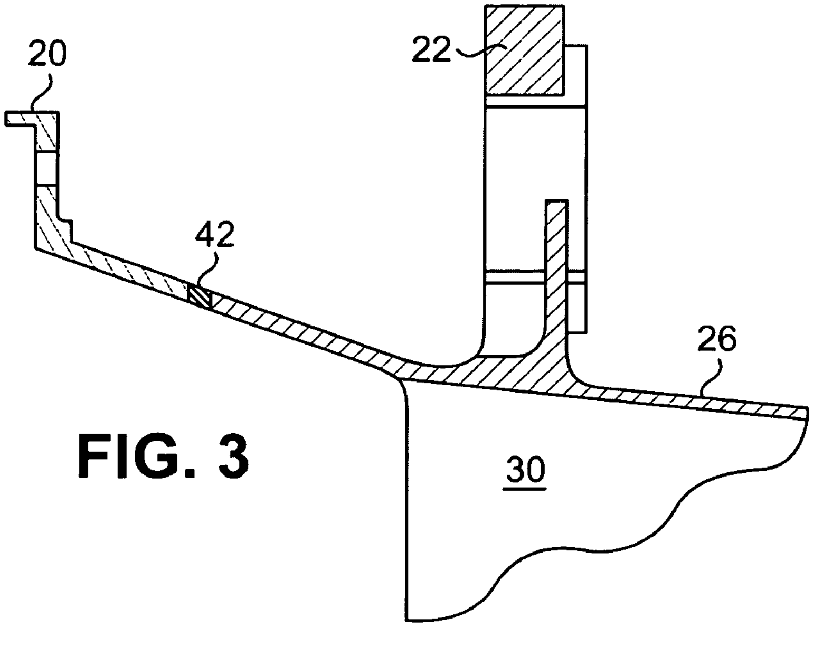
FIG. 3 is a cross-sectional view of a repaired portion of the turbine exhaust case segment.

FIG. 3 is a cross-sectional view of a repaired portion of the TEC segment 16. A replacement detail 20' is welded to the parent material of the TEC case 16 along the OD wall 26. A weld joint 42 is formed at a location that corresponds to the location of the cut plane 40 (see FIG. 1). Electron beam welding or other suitable techniques can be used to form the weld joint 42. The replacement detail 20' can have a shape that is substantially identical to the removed material of the TEC segment 16, and can be made of a different material than the parent material of the TEC segment 16. The replacement detail 20' can be made of the same material as the LPT case 14, or a material have substantially the same coefficient of thermal expansion as the material of the LPT case 14. For example, the replacement detail 20' can be made of an Inconel® 625 alloy while the parent material of the TEC segment 16 can be made of a Greek Ascoloy™ alloy. By making the replacement detail 20' of a dissimilar material from the parent material of the TEC segment 16, contact between the LPT case 14 and the TEC segment 16 can occur between materials with substantially the same coefficient of thermal expansion. In that way, creep at the connection between the LPT case 14 and the repaired TEC segment 16 can be reduced, which can help reduce rework, turnaround time (TAT), costs, future part damage, and engine time off-wing.

Figure 4:
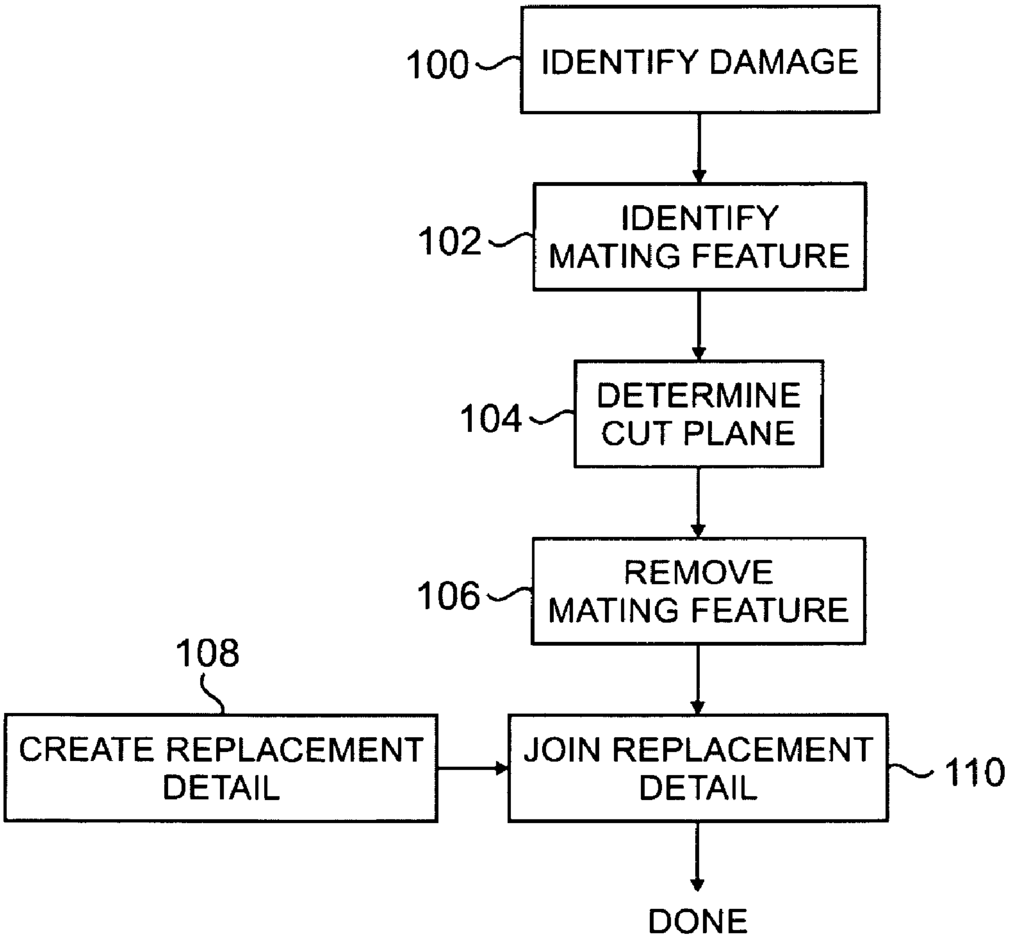
FIG. 4 is a flow chart of a repair method.

FIG. 4 is a flow chart of one embodiment of a repair. After a part has been removed from an engine for service, a first step is to identify damage to the part (step 100). Damage can include creep, bolt hole elongation, flange bending, cracks, etc. Next, a mating feature of the part is identified (step 102). The mating feature can include a flange or other structure that connects to another part in the engine. A cut plane is then determined (step 104). A portion of the part including the mating feature is removed from another portion of the part at the cut plane (step 106). A replacement detail is created (or otherwise provided) of a replacement material having a different coefficient of thermal expansion from the parent material of the part, and generally having the same shape as the removed portion that includes the mating feature (step 108). The replacement detail is then metallurgically joined to the parent material of the second portion of the part (step 110). The repair method can include one or more additional steps not particularly mentioned, such as heat treatment. Following repair, the part can be reinstalled in the engine and returned to service.

Although the present invention has been described with reference to exemplary embodiments, workers skilled in the art will recognize that changes may be made in form and detail without departing from the spirit and scope of the invention. For instance, repairs according to the present invention can be applied to components of various configurations and materials. Moreover, a repair according to the present invention can be performed in conjunction with other repair processes not specifically discussed above.

The invention claimed is:

1. A method of repairing a case for a gas turbine engine, the method comprising:

removing the case from the gas turbine engine;

removing a first portion of the case from a second portion of the case, wherein the first portion comprises a connection flange having a plurality of bolt holes formed therein; and metallurgically joining a replacement material to the second portion of the case to form a repaired case, wherein the replacement material has a different coefficient of thermal expansion than a parent material of the second portion;

reinstalling the repaired case in the gas turbine engine, wherein the step of reinstalling the repaired case in the gas turbine engine comprises fastening the connection flange to an adjacent structure, and wherein the adjacent structure is made essentially of the replacement material of the case.

2. The method of claim 1, wherein the step of removing the case from the gas turbine engine comprises unfastening the connection flange from an adjacent structure.

3. The method of claim 1, wherein the step of metallurgically joining a replacement material to the second portion of the case comprises:

providing the replacement material as a detail configured to replace the first portion of the case; and welding the detail to the second portion of the case.

4. The method of claim 1, wherein removing the first portion of the case involves complete removal of the connection flange.

5. An assembly comprising:

a first gas turbine engine component comprising a first metallic material; and a gas turbine engine case positioned adjacent to the first gas turbine engine component, wherein the gas turbine engine case comprises:

a first portion comprising a parent metallic material; and a second portion comprising a replacement metallic material metallurgically joined to the first portion, wherein the replacement metallic material is different from the parent metallic material, wherein the replacement metallic material has the same material specifications as the first metallic material, and wherein the second portion of the gas turbine engine case includes a flange bolted to the first gas turbine engine component such that contact between the first gas turbine engine component and the gas turbine engine case occurs between materials with the same coefficient of thermal expansion.

6. The assembly of claim 5, wherein the replacement material of the second portion is metallurgically joined to the parent material of the first portion by a weld joint.

7. The assembly of claim 5, wherein the first gas turbine engine component comprises a case.

8. The assembly of claim 5, wherein the first portion of the gas turbine engine case comprises an annular wall.

9. The assembly of claim 5, wherein the gas turbine engine case comprises a turbine exhaust case.

10. The assembly of claim 5, wherein the first metallic material comprises a superalloy.

11. The assembly of claim 10, wherein the superalloy comprises an alloy consistent with Aerospace Materials Specification (AMS) 5666 specifications.

12. The assembly of claim 5, wherein the parent metallic material comprises stainless steel.

13. The assembly of claim 12, wherein the stainless steel comprises an alloy consistent with Aerospace Materials Specification (AMS) 5616 specifications.

14. The assembly of claim 5, wherein the replacement metallic material and the parent metallic materials have different coefficients of thermal expansion.

15. A repaired gas turbine assembly comprising:

a first gas turbine engine case component comprising a superalloy; and a second gas turbine engine case component positioned adjacent to the first gas turbine engine case component, wherein the second gas turbine engine case component comprises:

a first portion comprising a parent material made of a stainless steel alloy; and a second portion comprising a flange fastened to the first gas turbine engine case component and metallurgically joined to the first portion of the second gas turbine engine case component, wherein the second portion comprises a repair material made of the same superalloy that comprises the first gas turbine engine case component, and wherein the stainless steel alloy and the superalloy have different coefficients of thermal expansion.

16. The assembly of claim 15, wherein the stainless steel alloy comprises an alloy consistent with Aerospace Materials Specification (AMS) 5616 specifications, and wherein the superalloy comprises an alloy consistent with (AMS) 5666 specifications.

* * * * *